United States Patent
Asberg et al.

[15] 3,643,302
[45] Feb. 22, 1972

[54] METHOD OF MAKING A ROLLING BEARING ASSEMBLY

[72] Inventors: Sture Asberg, Lilla Pukevagen 5, Savedalen, Sweden; Henrikus Jacobus Maria Timmer, Irenelaan 39, Ede, Netherlands

[22] Filed: Dec. 17, 1970

[21] Appl. No.: 99,107

[30] Foreign Application Priority Data

Nov. 14, 1968 Netherlands.....................6816232
Nov. 14, 1968 Netherlands.....................6816233

Related U.S. Application Data

[62] Division of Ser. No. 807,545, Mar. 17, 1969.

[52] U.S. Cl. .....................................................29/148.4 A
[51] Int. Cl. .........................................................B23p 11/00
[58] Field of Search...................29/148.4 A, 148.4, 434, 150

[56] References Cited

UNITED STATES PATENTS 3,213,518   10/1965   Saito ................................29/148.4 A
3,228,089   1/1966    Turner ..............................29/148.4 A Primary Examiner—Thomas H. Eager
Attorney—Howson and Howson

[57] ABSTRACT

A method for manufacturing a rolling bearing assembly consisting of inner and outer bearing elements having confronting raceways, a plurality of rolling elements in the annular space between the inner and outer bearing elements, each of the bearing elements being associated with a support member and an access opening in one of said bearing elements communicating with the space between said bearing raceways to permit the rolling elements to be positioned into said space, said method consisting of steps of machining each of said bearing elements to form the raceways and thereafter securing each bearing element to its respective support member.

3 Claims, 3 Drawing Figures

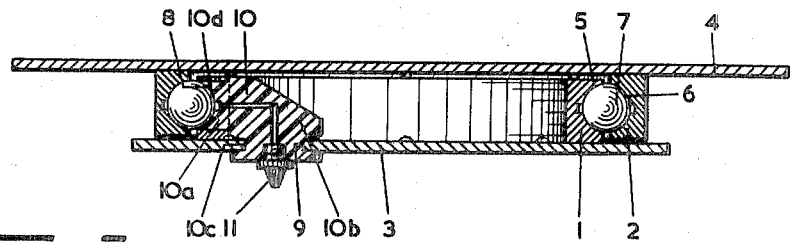
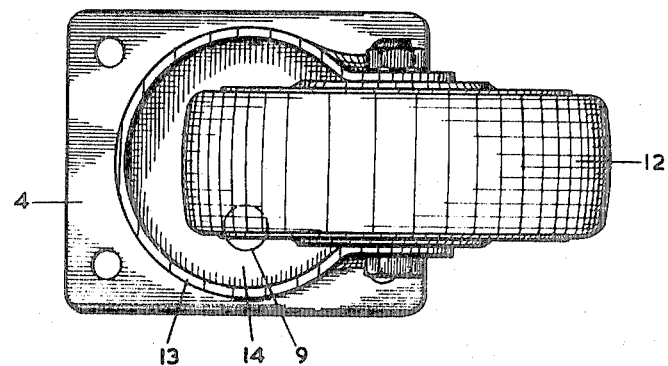
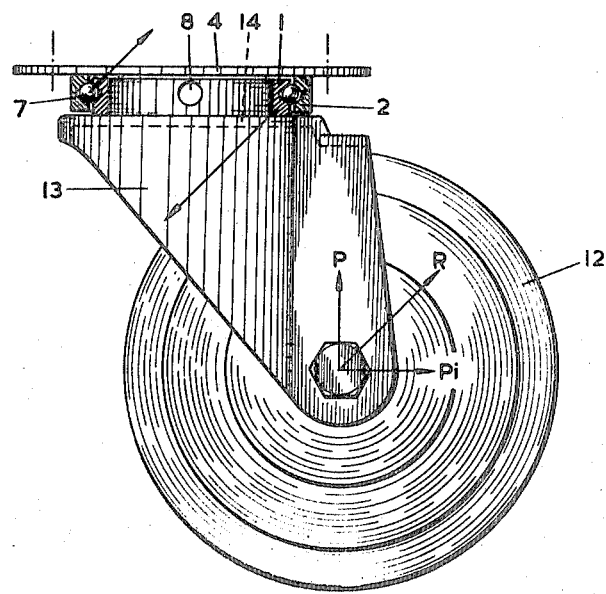
INVENTORS
STURE ÅSBERG
HENDRIKUS JACOBUS MARIA TIMMER
BY Howson & Howson
ATTORNEYS

METHOD OF MAKING A ROLLING BEARING ASSEMBLY

This is a divisional application of our prior copending application, Ser. No. 807,545 filed Mar. 17, 1969, for "Rolling Bearing."

The present invention relates to an improvement in rolling bearings, to a novel method for manufacturing a rolling bearing.

Some prior known rolling bearing assemblies of the type used for example in a swivel castor, consist of inner and outer bearing elements in the form of rings having confronting raceways or tracks which are spaced apart to accommodate a plurality of rolling elements, for example, balls. Each ring has an associated support member and an opening is provided in one of the rings to permit assembly of the rolling elements between the rings. The opening may be sealed by a plug after the rolling elements have been inserted into the space between the raceways.

One of the disadvantages of this type of prior art arrangement is the fact that since the two bearing rings are formed integrally with the support members, the raceways have to be machined subsequently to obtain the accurate configuration which, of course, is necessary for proper arrangement of the rolling elements relative to the raceways. Furthermore, these assemblies are rather expensive to manufacture since these assemblies are made of cast or forged steel parts and require various operations for finishing such as turning the bearing raceways, tempering and grinding.

A further disadvantage in these assemblies, particularly when they are employed in swivel castors, is that when the bearing is subjected to load from forces exerted by the rolling elements, it has been found that it is necessary to fill the access opening for assembling the rolling elements with a special plug member which is of the same material as the rings and has a smooth surface confronting the balls perfectly conforming to the rest of the raceway. This is a difficult and expensive assembly to make properly.

Still another disadvantage is that the forces effect an increase in stress on the material at the edge of the plug member and in the area of the access opening resulting in decreased life of the entire assembly.

Other known assemblies comprise essentially of confronting platelike support members wherein the raceways are formed by a stamping operation. In this type of configuration, it is necessary to provide retaining means to hold the plate members relative to one another which usually consists of a centrally disposed pin, rivet or a ring member for holding the platelike support members in place after the rolling elements have been positioned between the raceways. This is obviously a complex assembly.

An object of the invention is to provide a method for manufacturing a bearing construction of the aforesaid type, in accordance with which the bearing can be manufactured considerably cheaper but is of high quality.

Another object of the invention is to provide a rolling bearing construction which is not only simple and easy to manufacture, but also suitable for automatic mass production.

Still another object of the invention is to provide a rolling bearing construction in particular for a swivel castor in which a simple plug member can be used.

In accordance with the present invention, the inner and outer rings of the rolling bearing assembly are completely formed and thereafter secured to their respective support members by suitable means for example welding, soldering, glueing or other means. Preferably the rings are projection welded to the support member and are tempered prior to assembly to their respective support members.

In the present instance the inner and outer rings are secured at opposite axial end faces to their respective support members and an access opening is formed in the inner ring which is aligned with an orifice in the support member to which the inner ring is attached whereby the rolling elements may be inserted through the aligned orifice and opening into the annular space between the rings.

Forming and machining of the rings can be done automatically. The plates can also be cut to their proper sizes and machined by an automatic process. Tempering of the rings and fixing them to the plates can be done automatically, while feeding the rolling elements through the access hole by assembling the bearing can also be done easily the automatic way.

It is noted that the greatest strain exerted on the rolling elements for example in a castor assembly of the type shown in the drawings is at two diametrically opposing areas of the bearing assembly, that is, in the plane determined by the traveling position of the castors and that these strains rapidly diminished to zero from the two diametrically opposed areas of greatest strain towards the area situated at 90° from these points. Accordingly, the rolling elements of the bearing raceways situated at these areas are free of any strain. Thus, in accordance with the present invention, the access or feed opening for the rolling elements is located in the bearing element or ring which is connected to the support member on which the castor support is fixed or forms part of it and the axis of the opening is oriented so that it is perpendicular to the direction of the movement of the castor. In this way the area adjacent the access opening is not loaded so that a relatively simple stopper closing the access opening may be used since its only function is to prevent the rolling elements from escaping. Preferably, the plug member or stop is formed from a plastic material and snap fitted into the access opening.

In a preferred embodiment of the invention the access hole is formed in the inner bearing element while the associate support member has been provided with an orifice, allowing a tubelike tool to be inserted into the access hole from the outside, to feed the rolling elements into the space in between the bearing tracks by assembling the rolling bearing. In this embodiment the stopper can conveniently be formed so that it simultaneously blocks said orifice so as a perfect stopping is achieved.

Referring now to the drawing and particularly to FIG. 1 thereof, the bearing assembly of the present invention consists of a pair of rings, an inner ring 1 and an outer ring 2 which are secured, for example, by welding to plate members 3 and 4 respectively at opposite axial end faces of the inner and outer rings. The rings 1 and 2 are made of steel and formed with circumferentially extending grooves defining raceways 5 and 6 formed in such a manner that the rolling elements, in the present instance balls 7 bear or ride on the raceways at four points.

In order to assemble the balls 7 in the annular space between the rings, an access opening 8 is formed in the inner axial wall of the inner ring 1 and an orifice 9 is provide in the plate member 3 to the side of and adjacent the access opening 8. This arrangement with the rings properly positioned relative to one another, the balls 7 can simply be fed through the orifice 9 and access opening 8 by a tubelike tool. After the balls have been assembled, the access opening 8 and orifice 9 may be closed by a stop member 10 which can be provided with a grease channel and a grease nipple 11 for lubricating the bearing.

There is illustrated in FIGS. 2 and 3 a swivel castor incorporating a bearing assembly in accordance with the present invention. The swivel castor comprises a castor 12 rotatably supported between the ears 13 of a U-shaped bracket wherein the upper cross plate 14 in the present instance forms the lower platelike support member for the bearing assembly. It is noted that the bearing assembly shown in FIG. 1 may include its own lower plate 3 and that this plate may be suitably secured to the upper cross plate 14 of the castor assembly.

FIG. 3 illustrates how the action of the load P and impact load $P_i$ resulting from a load exerted in a vertical plane through the castor effects a resulting force R exerting a couple on the bearing whereby the balls and the raceways are peak loaded at two diametrically opposing areas. These areas are generally in the vicinity of the arrows marked $A_1$ and $A_2$ in FIG. 3. The areas of the bearing raceways situated 90° from the areas defined above are free of any strain and the access opening 8 is formed in the inner ring in the unloaded area of the raceway. Accordingly, no force will be exerted on the plug member 10 and this member will simply serve to prevent the balls from rolling to the outside through the orifice 8. It is noted that the relationship of the access opening 8 to loaded areas of the raceways remains the same even when the castor 12 rotates.

In the embodiment shown the stopper 10 is formed to simultaneously block access opening 8 and orifice 9 and is made of a plastic material to be snap fitted in place in the manner shown. Thus the stopper 10 has a pilot portion 10a engageable in the access opening and a main body portion 10b with a circumferential groove 10c to snap over the edge of the orifice 9, the pilot portion 10a having an arcuate face 10d to conform to the raceway of the inner ring.

The ball bearing according to the present invention consists of comparatively few parts which are of simple design whereby the assembly is relatively economical to manufacture.

We claim:

1. A method for manufacturing a rolling bearing assembly consisting of inner and outer bearing elements having confronting raceways, a plurality of rolling elements in the annular space between the inner and outer bearing elements, each of the bearing elements being associated with a support member and an access opening in one of said bearing elements communicating with the space between said bearing raceways to permit the rolling elements to be positioned into said space, said method consisting of steps of machining each of said bearing elements to form the raceways and thereafter securing each bearing element to its respective support member.

2. A method in accordance with claim 1 including the step of hardening each bearing element before it is secured to its respective support member.

3. A method as claimed in claim 1 including the step of securing each bearing element to its respective support member by projection welding.

* * * * *

UNITED STATES PATENT OFFICE
CERTIFICATE OF CORRECTION

Patent No. 3,643,302　　　　　　　Dated February 22, 1972

Inventor(s) STURE ASBERG and HENRIKUS J. M. TIMMER

It is certified that error appears in the above-identified patent and that said Letters Patent are hereby corrected as shown below:

Column 1, line 6; after "Netherlands" insert --,assignors to Aktiebolaget Svenska Kullagerfabriken, Goteborg, Sweden--

Signed and sealed this 3rd day of April 1973.

(SEAL)
Attest:

EDWARD M. FLETCHER, JR.　　　　　　ROBERT GOTTSCHALK
Attesting Officer　　　　　　　　　Commissioner of Patents